United States Patent
Matthias et al.

(10) Patent No.: US 7,648,383 B2
(45) Date of Patent: *Jan. 19, 2010

(54) DEVICE FOR LOCKING A POWER TOOL AND A RECHARGEABLE BATTERY PACK THAT IS INSERTABLE IN A GUIDE OF THE POWER TOOL

(75) Inventors: Wolf Matthias, Stuttgart (DE); Urs Roth, Flumenthal (CH); Huynh Cuong, Zuchwil (CH); Jochen Krauter, Hildrizhausen (DE)

(73) Assignee: Robert Bosch GmbH, Stuttgart (DE)

( * ) Notice: Subject to any disclaimer, the term of this patent is extended or adjusted under 35 U.S.C. 154(b) by 445 days.

This patent is subject to a terminal disclaimer.

(21) Appl. No.: 11/583,878

(22) Filed: Oct. 19, 2006

(65) Prior Publication Data

US 2007/0090700 A1    Apr. 26, 2007

(30) Foreign Application Priority Data

Oct. 24, 2005    (DE) .................. 10 2005 050 781

(51) Int. Cl.
*H01R 13/627*    (2006.01)

(52) U.S. Cl. .................. 439/352; 439/500; 429/97; 310/50; 173/217

(58) Field of Classification Search .................. 439/352, 439/500, 504, 577; 310/50; 173/217; 429/97
See application file for complete search history.

(56) References Cited

U.S. PATENT DOCUMENTS 7,413,460 B2 * 8/2008 Matthias et al. ............. 439/352
7,455,544 B2 * 11/2008 Glauning et al. ............ 439/352

* cited by examiner

*Primary Examiner*—Tho D Ta
(74) *Attorney, Agent, or Firm*—Michael J. Striker

(57) ABSTRACT

A device for locking a power tool and a rechargeable battery pack that is insertable in a guide of the power tool has a locking bar installable on a housing of the power tool and held in locking engagement with the rechargeable battery pack via spring force, a release mechanism that acts on the locking bar for manually releasing the locking bar from the locking engagement, the locking bar and the release mechanism forming a lever that is pivotally supportable in a rocker pivot on the housing, the locking bar being fixedly held via spring force and a recess formed at a top side of the rechargeable battery pack and is releasable by pivoting the lever from the locking engagement via a compression force applied to the release mechanism, which extends upwardly across a front base end of the housing.

11 Claims, 3 Drawing Sheets

DEVICE FOR LOCKING A POWER TOOL AND A RECHARGEABLE BATTERY PACK THAT IS INSERTABLE IN A GUIDE OF THE POWER TOOL

CROSS-REFERENCE TO A RELATED APPLIACTION

The invention described and claimed hereinbelow is also described in German Patent Application DE 102005050781.6 filed on Oct. 24, 2005. This German Patent Application, whose subject matter is incorporated here by reference, provides the basis for a claim of priority of invention under 35 U.S.C. 119(a)-(d).

BACKGROUND OF THE INVENTION

The present invention relates to a device for locking a power tool and a rechargeable battery pack that is insertable in a guide of the power tool, and a power tool.

To attach rechargeable battery packs to cordless, hand-guided power tools, it is already known, e.g., in the case of a few rechargeable battery pack-operated rotary hammers offered by the applicant, to insert the rechargeable battery pack—from the bottom up—via its upper end into a slot provided in the handle of the power tool, and to subsequently lock it using a sliding lock located in the lower region of the handle. To remove the rechargeable battery pack, the operator typically holds the power tool firmly with one hand and actuates the sliding lock with the other hand to disengage the lock. The operator must also hold the rechargeable battery pack firmly at the same time, to prevent the released rechargeable battery pack from falling out of the slot. This procedure is made more difficult by the fact that the rechargeable battery packs used are becoming larger and heavier due to the increasing requirements placed on output and operating time.

SUMMARY OF THE INVENTION

It is therefore an object of the present invention to provide a device locking a power tool, and also a rechargeable battery pack that is insertable in the guide of the power tool, which avoids the disadvantages of the prior art.

In keeping with these objects, one feature of the present invention resides, briefly stated, in a device for locking a power tool and a rechargeable battery pack that is insertable in a guide of the power tool, comprising a locking bar installable on a housing of the power tool and held in locking engagement with the rechargeable battery pack via spring force; a release mechanism that acts on said locking bar for manually releasing said locking bar from the locked engagement, said locking bar and said release mechanism forming a lever that is pivotally supportable in a rocker pivot on the housing, said locking bar being fixedly held via spring force and a recess formed at a top side of the rechargeable battery pack and is releasable by pivoting said lever from the lock engagement via a compression force applied to said release mechanism, which extends upwardly across a front base end of the housing.

Another feature of the present invention resides, briefly stated, in a power tool, comprising a tool part; a rechargeable battery pack; and a device for locking said tool part and said rechargeable battery pack, said device including a locking bar installable on a housing of the power tool and held in locking engagement with the rechargeable battery pack via spring force; a release mechanism that acts on said locking bar for manually releasing said locking bar from the locked engagement, said locking bar and said release mechanism forming a lever that is pivotally supportable in a rocker pivot on the housing, said locking bar being fixedly held via spring force and a recess formed at a top side of the rechargeable battery pack and is releasable by pivoting said lever from the lock engagement via a compression force applied to said release mechanism, which extends upwardly across a front base end of the housing.

The inventive device, and the inventive power tool have the advantage that the rechargeable battery pack can be easily prevented from falling out when it is released, because the hand that is used to actuate the release mechanism can prevent—without the use of force—the released rechargeable battery pack from sliding out of the guide, the opening of which is near the release button. Further advantages of a cordless power tool with the inventive device include the possibility of a simple, solid design, single-finger operation of the release mechanism, a small number of parts, easy assembly, reliable release function under all conditions that occur during operation of the power tool, and the fact that the locking bar is unencumbered by the weight of the rechargeable battery pack, which results in greater functional reliability of the locking mechanism.

In a preferred embodiment of the present invention, the locking bar and the release mechanism are integrally formed as a dual-arm lever, in the case of which one of the lever arms serves as the locking bar and, when the rechargeable battery pack is locked in place, it engages in a recess in the top side of the rechargeable battery pack, while the other lever arm serves as the release mechanism, which can be pressed downward to lift the locking bar out of the recess.

The locking mechanism can be realized with single-step or two-step locking. In the latter case, when the rechargeable battery pack is inserted in the guide, the locking bar engages with two recesses in succession in the top side of the rechargeable battery pack. The engagement in the first recess serves merely to secure the rechargeable battery pack, which is not connected electrically with a circuit of a load of the power tool until the locking bar engages in the second recess.

To make it possible to attach the rechargeable battery pack to the power tool without actuating the release button, the rechargeable battery pack and/or the locking bar advantageously have an oblique contact face, which displaces the lever against the force of the spring when the rechargeable battery pack is inserted in the guide.

A particularly simple and economical design of a rocker pivot of the lever in the housing of the power tool can be attained when the lever includes a cylindrical recess oriented transversely to the direction of insertion, into which two bearing journals can be inserted from diametrically opposed sides during assembly of the power tool; the bearing journals extend inwardly across diametrically opposed shells of the housing.

The lever with the release mechanism and the locking bar is advantageously made of plastic, as an injection-moulded part. As an option, a sheet-metal element can be inserted onto it to increase the wear-resistance of the locking bar. To prevent dust or other dirt particles from collecting under the release mechanism over time, where they could hinder the pivoting of the lever, an apron of the housing that encloses the release mechanism is preferably discontinuous in design, so that dust and dirt particles fall through the openings or can be blown out using compressed air.

While the guide is preferably oriented horizontally during normal operation and is open on its front end, i.e., in the working or feed direction of the power tool, so that the rechargeable battery pack can be inserted into the guide from the front and removed from the guide from the front, it can also be provided, according to another variant, that the power tool includes a vertical slot for the rechargeable battery pack, which is adjacent to the guide and is open toward the bottom, so that, once the rechargeable battery pack is released, it can first be slid in the guide a short distance toward the front, and then removed from the bottom via the slot. In both cases, the weight of the rechargeable battery pack is supported by the guide during operation, so that essentially no load is placed on the locking mechanism.

The present invention is explained below in greater detail in two exemplary embodiments, with reference to the attached drawing.

DESCRIPTION OF THE PREFERRED EMBODIMENTS

Figure 1:
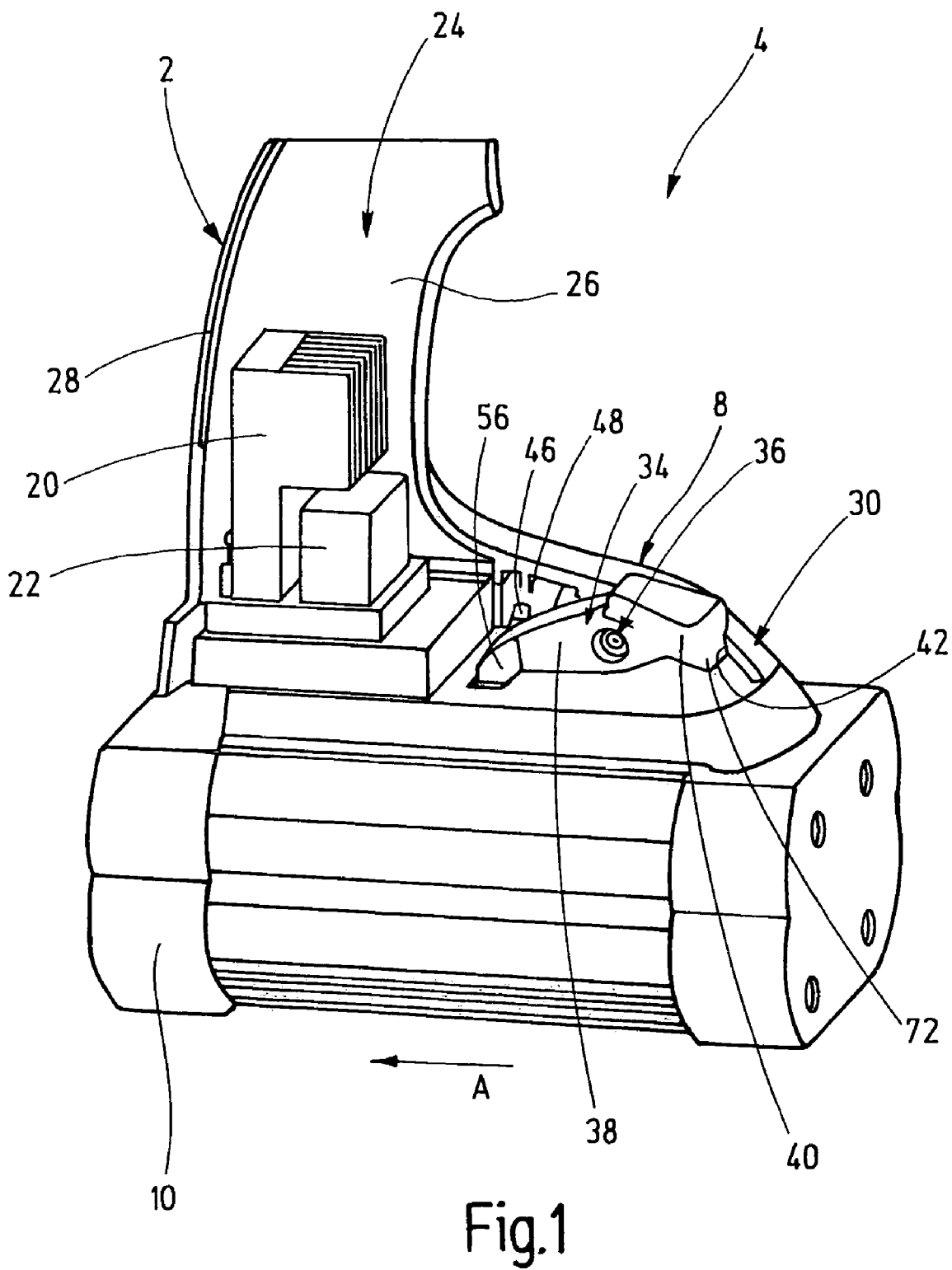
FIG. 1 shows a partial sectional, perspective view of a handle of a power tool and a rechargeable battery pack locked to it.

Handles 2—shown in the drawing—of two cordless, hand-guided power tools designed as a cordless screwdriver 4 (FIGS. 1 and 2) or a cordless rotary hammer 6 (FIG. 3) each include a locking mechanism 8, with which a rechargeable battery pack 10 serving as the power supply for power tool 4 or 6 can be detachably locked to handles 2 of power tools 4 and 6.

Figure 3:
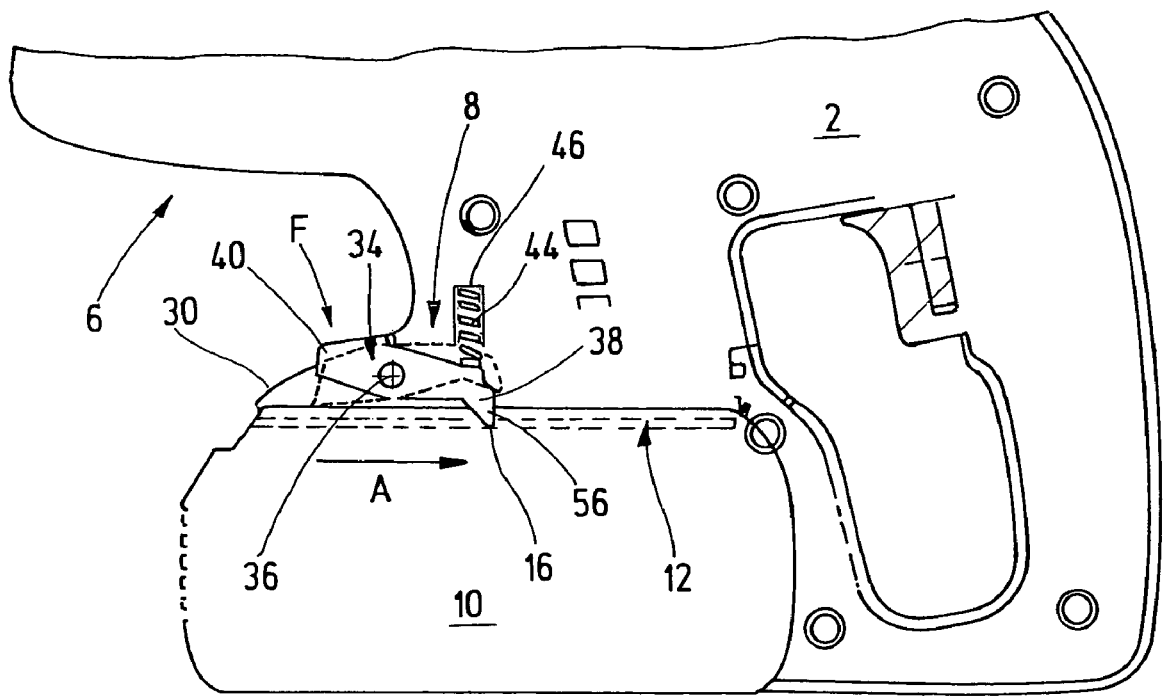
FIG. 3 shows a partially sectional, side view of the handle of another power tool and a rechargeable battery pack, in the locked and released states.

As best shown in FIG. 3 using rotary hammer 6 as an example, power tool 4, 6 has a guide 12 on the free, lower end of its handle 2, into which the upper end of rechargeable battery pack 10 can be inserted in the direction of arrow A from the front, i.e., against a working direction of power tool 4, 6. The motion of inserting rechargeable battery pack 10 is limited by interacting oblique faces (not shown) of rechargeable battery pack 10 and handle 2, which bear against each other when rechargeable battery pack 10 is properly locked with power tool 4, 6 and an electrical connection between connection contacts of a current accumulator of rechargeable battery pack 10 and a circuit of a load of power tool 4, 6 is established.

Figure 2:
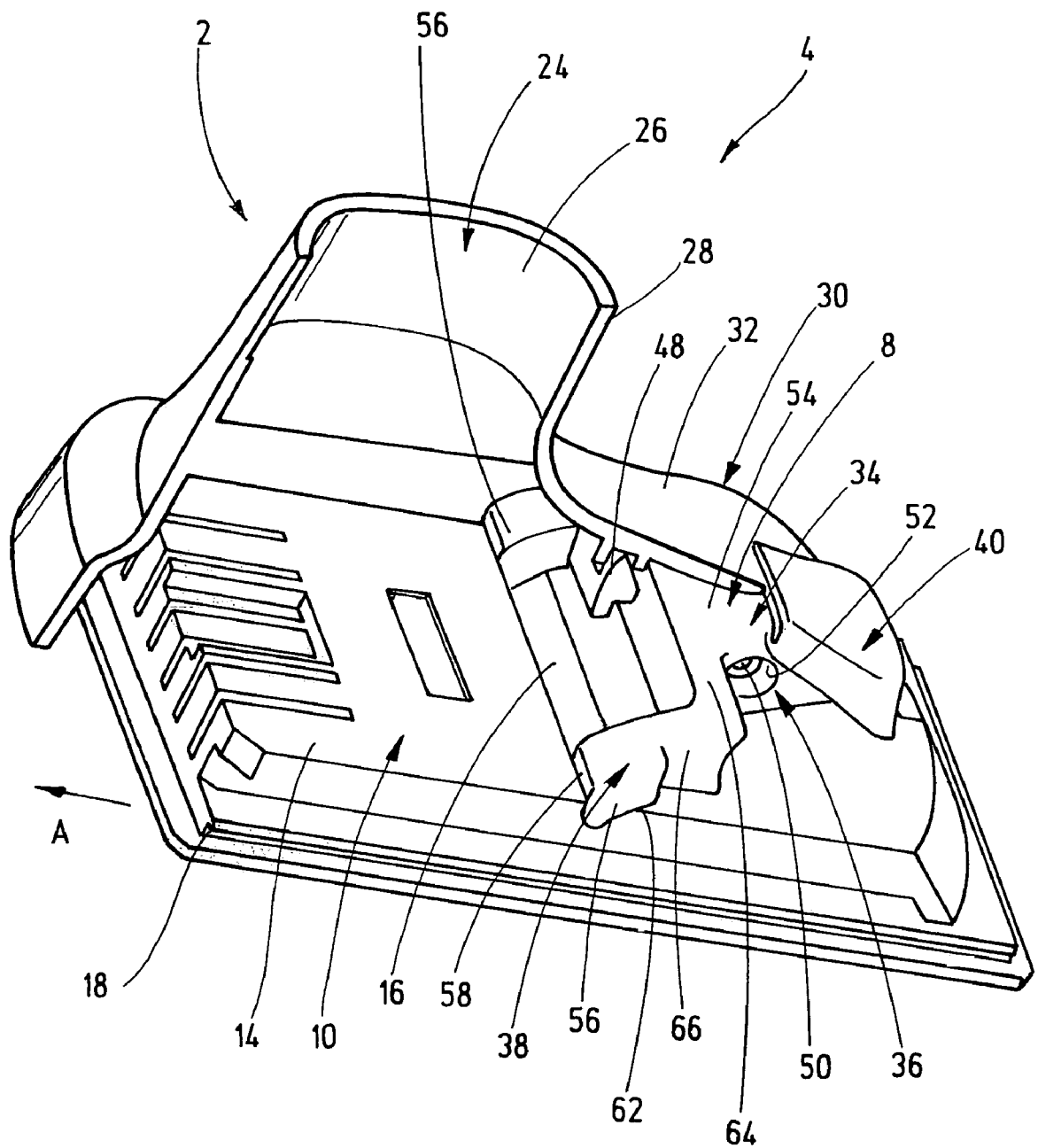
FIG. 2 shows another partial sectional, perspective view of the handle in FIG. 1, in a larger scale.

As best shown in FIGS. 1 and 2 using cordless screwdriver 4 as an example, rechargeable battery pack 10 is provided, on its upper end, with a holding and locking part 14, which extends upward and includes a locking recess 16 formed in its flat top side and extending transversely to the direction of insertion of rechargeable battery pack 10, and, below locking recess 16, is provided with a guide groove 18 on each of its diametrically opposed longitudinal sides. The two parallel guide grooves 18 serve to accommodate two complementary guide rails (not shown in FIGS. 1 and 2) of guide 12 of power tool 4, 6.

As shown in FIG. 1, handle 2 of power tool 4, 6 contains electrical components 20, 22, which are enclosed in a housing 24. Housing 24 is composed of two shell-shaped housing halves 26 (only one of which is shown) that are essentially symmetrical to a middle plane of power tool 4, 6, the diametrically opposed edges 28 of which overlap at least partially along the middle plane. Handle 2 includes a base end 30, which extends toward the front, i.e., in the working direction of power tool 4, 6, and against the direction of insertion of rechargeable battery pack 10, and which includes a domed top side 32, on the lower side edges of which the guide rails of guide 12 are integrally formed.

Locking mechanism 8 includes a dual-arm rocking lever 34, which is supported in a rocker pivot 36 in the interior of base end 30 of handle 2 such that it is displaceable against a spring force. The one lever arm 38 of rocking lever 34 serves as a locking bar, which can be engaged in recess 16 formed in the top side of rechargeable battery pack 10, to lock rechargeable battery pack 10 with power tool 4, 6 after it is inserted in guide 12. The other lever arm 40 of rocking lever 34 serves as a release button, which extends through a housing opening 42 and over top side 32 of base end 30 of handle 2 and can be pressed downward by hand in the direction of arrow F in FIG. 3, to bring the rocking lever in the release position shown in FIG. 3 with dashed lines, in which released rechargeable battery pack 10 can be removed from guide 12, e.g., for recharging.

As best shown in FIG. 3, the spring force acting on rocking lever 34 is applied by a helical compression spring 44, which presses locking bar 38 from the top into recess 16 of rechargeable battery pack 10, after it has been fully inserted into guide 12 of handle 2. Spring 44 is oriented essentially perpendicular to guide 12 and is inserted on the middle plane of housing 24 in a recess 46—that is open toward the bottom—of a spring holder 48 (FIGS. 1 and 2), which is integrally formed above lever arm 38 on the inside of one of the two housing halves 26, and extends downward and in the direction of the other housing half 26.

Rocker pivot 36 is composed of two aligned, cylindrical bearing journals 50, which extend transversely to the direction of insertion of rechargeable battery pack 10 across the insides of the two housing halves 26 and, when housing 24 is assembled, are inserted into a cylindrical passage 52 in a central bearing part 54 of rocking lever 34, to secure it such that it can pivot around its longitudinal axis.

Locking bar 38, which extends over bearing part 54 of lever 34 in the direction of insertion of rechargeable battery pack 10 includes, on its free end, one (FIG. 3) or two (FIGS. 1 and 2) laterally separated locking tabs 56 designed to engage in recess 16 of rechargeable battery pack 10. One or all of the locking tabs 56 are provided, on the back side, with an oblique contact face 58, which, once rechargeable battery pack 10 is locked, is oriented essentially perpendicularly to the direction of insertion and bears against a complementary contact surface of recess 16, so that a motion of rechargeable battery pack 10 against the direction of insertion is blocked. On its side pointing toward the front, one or all of the locking tabs 56 are provided with an oblique contact face 62, which, when rechargeable battery pack 10 is inserted in guide 12, interacts with the insertion end of holding and locking part 14, to displace rocking lever 34 against the force of spring 44.

With locking mechanism 8 shown in FIGS. 1 and 2, locking bar 38 is designed in the shape of a fork to reduce its weight. It is composed of a yoke part 64 integrally moulded on bearing part 54 and two leg parts 66, which extend past yoke part 64 with lateral separation, the widened free ends of which each form one of the two locking tabs 56, so that locking bar 38 engages with rechargeable battery pack 10 symmetrically to the middle plane of housing 24.

Figure 4:
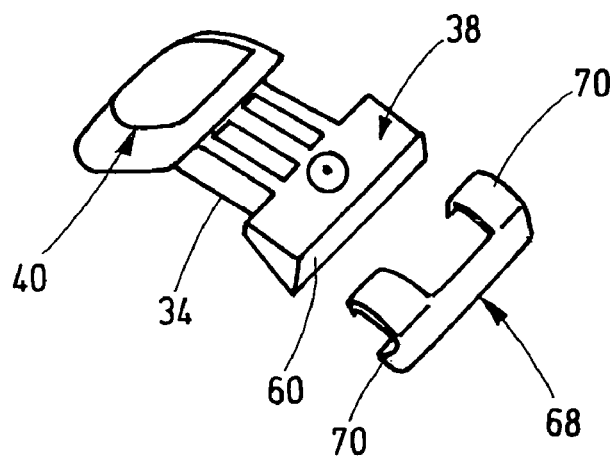
FIG. 4 shows a perspective view of two parts of a locking mechanism that serves to lock the rechargeable battery pack with the power tool.

To increase the wear-resistance of locking bar 38, a sheet-metal element 68 can be inserted on locking tab(s) 56, as shown in FIG. 4 using a continuous locking tab 56 as an example. Inserted sheet-metal element 68 covers contact surface 60 and oblique contact face 62 and includes retaining clips 70 on its upper and lower edge for fixedly clamping onto locking tab 56.

As best shown in FIG. 1, release button 40 includes, on its front end face, a narrow projection 72 located inside housing 24 and designed to match the edge of housing opening 42, which bears against the edge of opening 42 when button 40 is not actuated, and prevents dust and dirt from entering opening 42.

Figure 5:
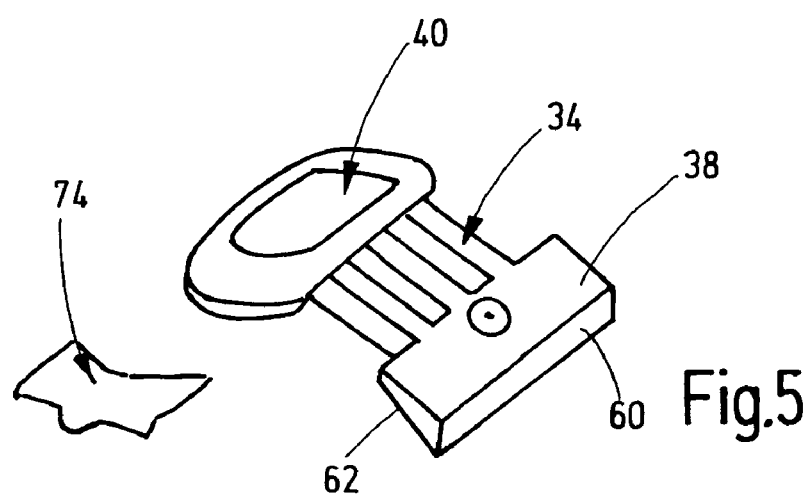
FIG. 5 also shows a perspective view of two parts of a locking mechanism that serves to lock the rechargeable battery pack to the power tool.

As an alternative, an apron 74, which encloses release button 40 and is designed as part of housing 24, can be provided with openings 76, as shown in FIG. 5, for example, through which dust—which has penetrated beneath release button 40—can fall out or be blown out, to prevent dirt from accumulating under button 40.

The term "rechargeable battery pack" 10 used within the scope of this application is intended to refer primarily to a pack with rechargeable current accumulators (rechargeable battery packs), although it can also refer to a pack with disposable current accumulators (batteries). Locking mechanism 8 described is also basically suited for use not only to lock rechargeable battery packs 10 to power tools 4, 6, but also to any other type of cordless electric devices.

It will be understood that each of the elements described above, or two or more together, may also find a useful application in other types of constructions differing from the type described above.

While the invention has been illustrated and described as embodied in a device for locking a power tool and a rechargeable battery pack that is insertable in a guide of the power tool, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for locking a power tool and a rechargeable battery pack that is insertable in a guide of the power tool, comprising a locking bar installable on a housing of the power tool and held in locking engagement with the rechargeable battery pack via spring force; a release mechanism that acts on said locking bar for manually releasing said locking bar from the locking engagement, said locking bar and said release mechanism forming a lever that is pivotally supportable in a rocker pivot on the housing, said locking bar being fixedly held via spring force in a recess formed at a top side of the rechargeable battery pack and is releasable by pivoting said lever from the locking engagement via a compression force applied to said release mechanism, which extends upwardly across a front base end of the housing.

2. A device as defined in claim 1, wherein said locking bar and said release mechanism form a dual-arm lever mechanism, with one lever arm serving as said locking bar and the other lever arm serving as the release mechanism.

3. A device as defined in claim 1, wherein said locking bar is configured so that it is engageable in at least two recesses in succession in a top side of the rechargeable battery pack when the rechargeable battery pack is inserted in the guide.

4. A device as defined in claim 1, wherein said locking bar is configured so that an oblique contact face is provided between said locking bar and rechargeable battery pack and displaces said lever against a force of a spring when the rechargeable battery pack is inserted in the guide of the power tool.

5. A device as defined in claim 4, wherein said locking bar is provided with said oblique contact face.

6. A device as defined in claim 1, wherein said rocker pivot of said lever includes a cylindrical recess in said lever; and further comprising two bearing journals adapted to extend into said recess from two diametrically opposite sides, said bearing journals extending inwardly across diametrically opposed parts of the housing.

7. A device as defined in claim 1; and further comprising a wear guard inserted on said locking bar.

8. A device as defined in claim 1; and further comprising a discontinuous housing apron, said release mechanism being enclosed by said discontinuous housing apron.

9. A device as defined in claim 1; and further comprising a spring provided said spring force and formed as a helical compression spring that acts on said locking bar from above.

10. A power tool, comprising a tool part; a rechargeable battery pack; and a device for locking said tool part and said rechargeable battery pack, said device including a locking bar installable on a housing of the tool part and held in locking engagement with the rechargeable battery pack via spring force; a release mechanism that acts on said locking bar for manually releasing said locking bar from the locking engagement, said locking bar and said release mechanism forming a lever that is pivotally supportable in a rocker pivot on the housing, said locking bar being fixedly held via spring force and a recess formed at a top side of the rechargeable battery pack and is releasable by pivoting said lever from the locking engagement via a compression force applied to said release mechanism, which extends upwardly across a front base end of the housing.

11. A power tool as defined in claim 10; and further comprising means for providing a vertical slot for said rechargeable battery pack, which is adjacent to said guide and is open toward a bottom.

\* \* \* \* \*